US006768815B2

(12) United States Patent
Woodall

(10) Patent No.: US 6,768,815 B2
(45) Date of Patent: Jul. 27, 2004

(54) COLOR SENSOR

(75) Inventor: Roger L. Woodall, Jewett City, CT (US)

(73) Assignee: The United States of America as represented by the Secretary of the Navy, Washington, DC (US)

(*) Notice: Subject to any disclaimer, the term of this patent is extended or adjusted under 35 U.S.C. 154(b) by 622 days.

(21) Appl. No.: 09/853,921

(22) Filed: May 10, 2001

(65) Prior Publication Data

US 2002/0168101 A1 Nov. 14, 2002

(51) Int. Cl.$^7$ ................................................ G06K 9/00
(52) U.S. Cl. ........................ 382/162; 358/1.9; 348/273
(58) Field of Search ........................ 382/162, 164–167, 382/303–304, 205, 312, 1.9, 513, 514–524; 348/272, 273, 222.1, 229.1, 230.1, 240.2; 345/589–593, 600–604

(56) References Cited

U.S. PATENT DOCUMENTS

| | | | | |
|---|---|---|---|---|
| 4,963,981 A | * | 10/1990 | Todaka et al. | ........... 348/240.2 |
| 5,887,087 A | * | 3/1999 | Tamagawa et al. | ......... 382/312 |
| 6,469,804 B1 | * | 10/2002 | Ott et al. | ..................... 358/1.9 |

* cited by examiner

Primary Examiner—Leo Boudreau
Assistant Examiner—Ishrat Sherali
(74) Attorney, Agent, or Firm—James M. Kasischke; Michael F. Oglo; Jean-Paul A. Nasser

(57) ABSTRACT

A color sensor for generating color information defining colors of an image includes an input section, a color processing section, a color comparison section, a color boundary processing section and a memory processing section. The input section includes an array of transducer pairs, each pair defining one of a plurality of pixels. Each transducer pair generates two peak outputs, one for the selected color of each transducer of the pair. A plurality of pixel processors in the color processing section each receives the outputs from one of the transducer pairs. The color processing section generates a color feature vector representative of the brightness of the light incident on the pixels and a color value corresponding to the ratio of outputs from the transducers comprising the transducer pair associated with the pixels. The color boundary processing section generates a plurality of color boundary feature vectors, each representing the difference between the color value for a pixel and its neighboring pixels. The color comparator processor measures and compares the reflective color of two objects and the memory processor section provides a process to recognize a color, a boundary of color and/or a comparison of colors.

12 Claims, 4 Drawing Sheets

COLOR SENSOR

CROSS-REFERENCE TO RELATED APPLICATIONS

This patent application is co-pending with related patent applications entitled NEURAL DIRECTORS (U.S. patent application Ser. No. 09/436,957), NEURAL SENSORS (U.S. patent application Ser. No. 09/436,956), STATIC MEMORY PROCESSOR (U.S. patent application Ser. No. 09/477,638), DYNAMIC MEMORY PROCESSOR (U.S. patent application Ser. No. 09/477,653), MULTIMODE INVARIANT PROCESSOR (U.S. patent application Ser. No. 09/641,395) and A SPATIAL IMAGE PROCESSOR (Ser. No. 09/853,932), by the same inventor as this patent application.

STATEMENT OF GOVERNMENT INTEREST

The invention described herein may be manufactured by or for the Government of the United States of America for Governmental purposes without the payment of any royalties thereon or therefore.

BACKGROUND OF THE INVENTION (1) Field of the Invention

The invention relates generally to the field of color sensors and more particularly to color sensors having neural networks with a plurality of hidden layers, or multi-layer neural networks, and further to a new neural network processor for sensing color in optical image data.

(2) Description of the Prior Art

Electronic neural networks have been developed to rapidly identify patterns in certain types of input data, or accurately to classify the input patterns into one of a plurality of predetermined classifications. For example, neural networks have been developed which can recognize and identify patterns, such as the identification of hand-written alphanumeric characters, in response to input data constituting the pattern of on and off picture elements, or "pixels", representing the images of the characters to be identified. In such a neural network, the pixel pattern is represented by, for example, electrical signals coupled to a plurality of input terminals, which, in turn, are connected to a number of processing nodes, each of which is associated with one of the alphanumeric characters which the neural network can identify. The input signals from the input terminals are coupled to the processing nodes through certain weighting functions, and each processing node generates an output signal which represents a value that is a non-linear function of the pattern of weighted input signals applied thereto. Based on the values of the weighted pattern of input signals from the input terminals, if the input signals represent a character that can be identified by the neural network, the one of the processing nodes associated with that character will generate a positive output signal, and the others will not. On the other hand, if the input signals do not represent a character that can be identified by the neural network, none of the processing nodes will generate a positive output signal. Neural networks have been developed which can perform similar pattern recognition in a number of diverse areas.

The particular patterns that the neural network can identify depend on the weighting functions and the particular connections of the input terminals to the processing nodes. The weighting functions in, for example, the above-described character recognition neural network, essentially will represent the pixel patterns that define each particular character. Typically, each processing node will perform a summation operation in connection with values representing the weighted input signals provided thereto, to generate a sum that represents the likelihood that the character to be identified is the character associated with that processing node. The processing node then applies the non-linear function to that sum to generate a positive output signal if the sum is, for example, above a predetermined threshold value. Conventional non-linear functions which processing nodes may use in connection with the sum of weighted input signals is generally a step function, a threshold function, or a sigmoid, in all cases the output signal from the processing node will approach the same positive output signal asymptotically.

Before a neural network can be useful, the weighting functions for each of the respective input signals must be established. In some cases, the weighting functions can be established a priori. Normally, however, a neural network goes through a training phase, in which input signals representing a number of training patterns for the types of items to be classified, for example, the pixel patterns of the various hand-written characters in the character-recognition example, are applied to the input terminals, and the output signals from the processing nodes are tested. Based on the pattern of output signals from the processing nodes for each training example, the weighting functions are adjusted over a number of trials. After the neural network has been trained, during an operational phase it can generally accurately recognize patterns, with the degree of success based in part on the number of training patterns applied to the neural network during the training stage, and the degree of dissimilarity between patterns to be identified. Such a neural network can also typically identify patterns that are similar, but not necessarily identical, to the training patterns.

One of the problems with conventional neural network architectures as described above is that the training methodology, generally known as the "back-propagation" method, is often extremely slow in a number of important applications. In addition, under the back-propagation method, the neural network may result in erroneous results that may require restarting of training. Even after a neural network has been through a training phase, confidence that the best training has been accomplished may sometimes be poor. If a new classification is to be added to a trained neural network, the complete neural network must be retrained. In addition, the weighting functions generated during the training phase often cannot be interpreted in ways that readily provide understanding of what they particularly represent.

Edwin H. Land's Retinex theory of color vision is based upon "three color" experiments performed before 1959. A simple "mishap" showed that three colors were not always required to see accurate color. Land used a short and long record of brightness data (black and white transparencies) to produce color perceived by human eyes and not by photographic means. He demonstrated a perception of a full range of pastel colors using two very similar in color light sources such as yellow, at 579 nm and yellow orange, at 599 nm ("Experiments in Color Vision", Edwin H. Land, Scientific American, Vol. 200 No. May 5, 1959). Land found that in some two record experiments all colors present were not perceived. Although Land demonstrated that two records provided color perceptions, he constructed his Retinex theory upon three records such as his long, medium and short records (An Alternative Technique for the Computation of the Designator in the Retinex Theory of Color Vision", Edwin H. Land, Proceedings of the National Academy of Sciences, Vol. 83, 1986). The invention herein is related to human color perception discovered during Land's color vision experiments as reported in 1959.

The "Trichromatic" theory in human color vision has been accepted on and off since the time of Thomas Young in 1802 (A Vision in the Brain", S. Zeki, Blackwell Scientific Publishing, 1993). Still and video electronic camera designs are correctly based upon the trichromatic theory but the current designs are highly subjective to color error reproduction due to changes in the ambient light color temperatures and color filtrations. The device in this invention senses color using a new "bichromatic" theory, which includes a mechanism that insures color constancy over a large range of ambient color temperatures. The use of two lightness records as used by Land in 1959 is one key to this invention.

The bichromatic theory is based upon an interpretation of a biological color process that occurs in the eyes and brain of humans and in some animals. The bichromatic theory is defined as a system that functions together under the following assumptions, accepted principles and rules of procedure, for which FIGS. 4A and 4B are provided for support:

(1) The system is a color sensing retina. There are at least two photo transducers in each pixel space in the retina, shown in FIG. 4B as TR(HI) and TR(LO).

(2) The two photo transducers sense the color of the light at each pixel's position in a scene of color focused on the retina. Each of the at least photo transducers contains a different spectral response and the wavelength difference between the peaks of a pair of these responses is called the waveband or the spectral bandwidth of the two photo transducers.

(3) The two photo transducers have overlapping spectral logarithmic responses where their slopes are opposing each other as indicated in FIG. 4A.

(4) The photo transducers have at least two controlled gain amplifiers (CGA) and at least two common controlling circuits. There is one controlled gain amplifier for each photo transducer where each of the at least two common controlling circuits controls the controlled gain amplifiers for all the photo transducers of the same spectral response.

(5) The highest energy value in the retina, or the peak energy from a photo transducer of a specific spectral response, controls the output of the common controlling circuits that normalize the logarithmic response of all photo transducers with the same spectral response. Thus, it is always the peak energy photo transducer no matter its position in the retina that controls the common mode gain. The peak response of a photo transducer is relative to the best matched wavelength of energy for all wavelengths of light impinging on the color retina. Therefore, each photo transducer will be continuously normalized to the peak photo transducer signal in response to changes in ambient lighting.

(6) In a general discussion herein a normalized photo transducer or a normalized pixel includes the controlled gain amplifier as part of its response. A photo transducer sensing the peak energy or a peak energy sensing photo transducer will only be called as such thus a normalized photo transducer will not specifically include a peak energy sensing photo transducer.

(7) There are three color coordinates called hue, lightness and saturation. Three degrees of freedom are required to categorize all combinations of color attributes. Two points in a two dimensional space can be connected by a line. Combinations of positions of these two points in space can produce at least three families of lines in the two dimensional space. The line families are horizontal, vertical and sloped. FIG. 4A shows a two dimensional graph of the responses of two normalized photo transducers. A straight line on the graph may represent the two output values of the normalized photo transducers for a specific input light condition. The graph coordinates are light wavelength for the horizontal axis and signal in a natural log scale for the vertical axis. Output values of the two normalized photo transducers can be represented by three families of lines.

(8) The response "curve" of a normalized photo transducer output signal for a normalized light energy input is shown as a straight line, from the maximum response at its wavelength, down to the bottom at the opposite side of the graph. Each response curve of the normalized photo transducers has opposing slopes that cross each other. A normalized photo transducer response over the waveband is given as $TR(b)=ce^{-kx}$, where: x equals the wavelength position in the normalized waveband relative to the maximum response of the photo transducer, i.e., (0 to 1); c, the conversion constant, equals one for a normalized light energy, or, alternately, an integrated CGA value; k equals approximately 10; and b is the high or low transducer. The output signal level is symbolized by E1 for the low wavelength normalized photo transducer and E2 for the other.

(9) A broad constant energy spectrum of visible light relative to its color temperature "flattens" its spectral energy curve as the color temperature increases from a deep red at 1000° K. to a "slightly bluish" white at 10,000° K. Thus, when the peak energy photo transducers normalize the retina's response, the results are equivalent to "whitening" the pixel's responses in the waveband of sensible colors. In other words, possibly different energies near the wavelength of the maximum sensitivities of the peak energy transducers contain approximately equal spectral energies at the output of the respective controlled gain amplifiers. This process develops a color constancy in ambient lights of different color temperatures.

(10) A family of horizontal lines can represent the normalized photo transducer responses to a broadband family of white light from bright through gray to dark. Example 1 on the graph is a representation of this family. A family of vertical lines can represent a family of wavelengths in the waveband. Example 2 on the graph is a representation of the wavelength of a monochromatic light source. Families of sloped lines, from a horizontal position to a vertical position, closely represent a morphing from "white" to a monochromatic light. A change from white light to a light of a pure color is along the axis for the color attribute of saturation. Example 3 on the graph is a representation of a pastel color. The three families of lines are closely mapped to the three color coordinates of hue, lightness and saturation, but not with an exact one to one correlation. A combination of either set of three dimensions of color attributes can be mapped into the other. The two response values of a normalized pixel can represent a line that can move in combinations of the three coordinate ways to represent exact changes in lightness, hue and saturation of colors.

(11) The output values of a normalized pixel, in response to a monochromatic light, shall exhibit proportional photo transducer output values of E1 and E2 that are relative to the wave length of the light in the waveband between the two photo transducers. In the case where there is a broad spectrum of light illuminating an object, the different reflective bands of light relative to the wavelength responses of the normalized pixel will produce photo transducer output values in proportional to values that would be generated by a colored light of the perceived color.

(12) Changing the pixel's response from straight lines to curved lines on the logarithmic scale does not change the two point families of lines but it will change the form of the mapping between the two different color attributes.

(13) There is another control mode that increases the dynamic range of the sensibility to light of all photo transducers in the retina. This control sums the energy of all spectral responses to adjust an iris to maintain a constant energy to the retina under varying environmental lighting intensities.

(14) This bichromatic theory projects that human color vision may not be as commonly believed. The human retina contains three color cones to sense three different wavelengths of light, which may be used as two color pairs such as a blue-green pair and a red-green pair. Each color pair is processed in the visual cortex to map colors that can be associated to the visual space of an object in a scene. The two color pairs and processing will produce a wide range of colors sensed and a wide range of color constancy. Edwin H. Land's pre-1959 experiments using two black and white transparencies and two color filters produced a perception of color. The color perception and constancy occur because the brightest area of one of the projected transparencies normalizes the response of the appropriate set of human color cones to the specific color projected and the same occurs for the other transparency. The normalized human retina now sees varying ratios of brightness (energy) over the visual scene, which produces the perception of colors of light for the specific color temperatures of natural or artificial light. The bichromatic theory of color is an integration of the above fourteen theorems that together define the workings of color perception and color constancy.

SUMMARY OF THE INVENTION

It is therefore an object of the invention to provide a new and improved neural network color sensor.

It is a further object to provide a neural network color sensor in which the weighting functions may be determined a priori.

Another object of the present invention is to provide a neural network color sensor, which can be trained with a single application of an input data set.

In brief summary, the color sensor generates color information defining colors of an image, comparison of colors illuminated under two or more light sources and boundaries between different colors. The color sensor includes an input section, a color processing section, a color comparison section, a color boundary processing section and a memory processing section. The input section includes an array of transducer pairs, each transducer pair defining one of a plurality of pixels of the input section. Each transducer pair comprises at least two transducers, each generating an output having a peak at a selected color, the selected color differing as between the two transducers, and each transducer having an output profile comprising a selected function of color. The color processing section includes a plurality of color pixel processors, each receiving the outputs from the two transducers comprising the transducer pair associated with a pixel. In response, the color processing section generates a color feature vector representative of the brightness of the light incident on the pixel and a color value corresponding to the ratio of outputs from the transducers comprising the transducer pair associated with the pixel. The color boundary processing section generates a plurality of color boundary feature vectors, each associated with a pixel, each representing the difference between the color value generated by the pixel color processor for the respective pixel and color values generated by the pixel color processor for pixels neighboring the respective pixel.

The color boundary sensor produces object shape feature vectors from a function of the differences in color. This color boundary sensor can sense a colored object shape in a color background where a black and white sensing retina could not detect differences in lightness between the background and the object. The color comparator processor can measure and compare the reflective color of two objects, even when each object is illuminated by two lights of different color temperatures. The memory processor section provides a process to recognize a color, a boundary of color and a comparison of colors.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein:

FIG. 1A is an expanded view of a transducer pair;

DESCRIPTION OF THE PREFERRED EMBODIMENT

Figure 1:
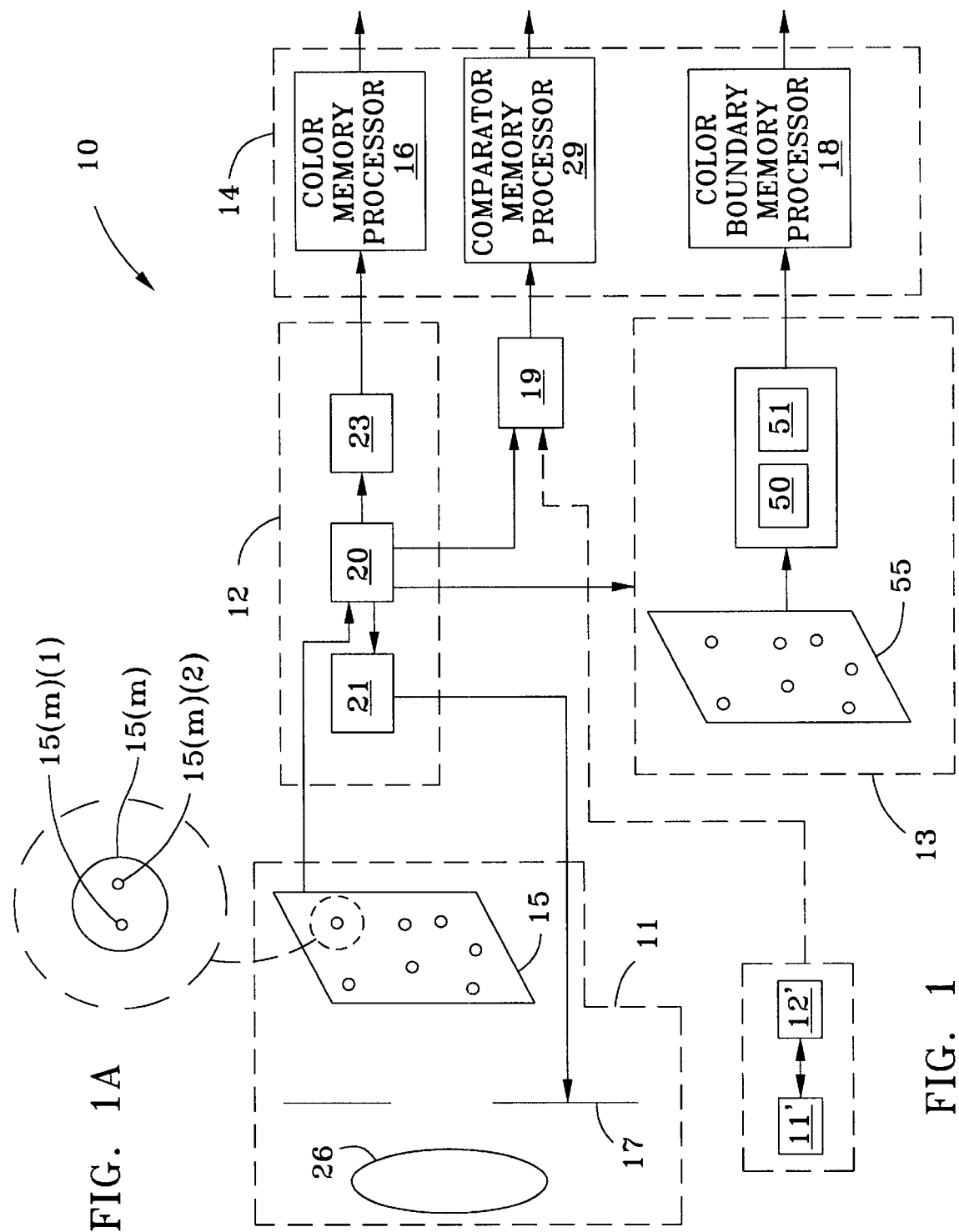
FIG. 1 is a functional block diagram of a color sensor constructed in accordance with the invention.

FIG. 1 is a functional block diagram of a color sensor 10 constructed in accordance with the invention. By way of background, the color sensor 10 operates in accordance with a "bi-chromatic" mechanism of color recognition, which is theorized as being similar to the way in which human beings see and recognize color. In the conventional "tri-chromatic" color recognition mechanism, any color light, either reflected or incidental, can be generated combining three different color illuminations. In the reverse, i.e., color recognition, any input color can be represented or analyzed as a combination of three colors, i.e., base colors. Accordingly three transducers, each sensing one of the base three colors, can be used to determine the contribution of each of the base colors in the input color. In the bi-chromatic mechanism, colors can be distinguished using two color transducers, which have peak sensitivity at different colors, and provide a known output signal response as a function of the input color. The color sensor 10 determines, for an input image, the distribution of colors over the image, using two color transducers to identify the color at each point (that is, for each pixel or picture element) in the image. The color boundary process produces object shape features relative to the boundaries between different colors. The color comparator process produces comparative features relative to a "true reflective color" in ambient lights of different color temperatures. The reading of a "true reflective color" in an ambient light of a color temperature and the reading of the same "true reflective color" in an ambient light of a second color temperature is a process that mimics human color constancy.

With reference to FIG. 1, the color sensor 10 includes an input section 11, a color processing section 12 and a color boundary processing section 13, a color comparison processor 19 and a memory processor 29. The color processing section 12 and a color boundary processing section 13 both generate color and color boundary feature vectors, which may be provided to, for example, a memory processing section 14. The input section 11 receives an image of an object and generates, for each point, or pixel, color information signals representative of the color at the particular point of the image. The input section 11 includes a "retina" 15, which comprises an array of transducer pairs 15(1) through 15(M) (generally identified by reference numeral 15(m) and shown in the expanded view of FIG. 1A), which define the pixels of the image. Each transducer pair comprises two transducers, which have output peaks at two different frequencies and which provide a predetermined output value as a function of a color wave band. Preferably, all of the pixels will have one transducer 15(m) (1) which has a peak output at one frequency identified as 1 and the second transducer 15(m) (2) having a peak output at a second frequency identified as 2. The input section 11 further includes a lens 26, which focuses an image of the object onto the retina 15, and an iris 17, which controls the intensity of light incident on the retina 15.

The color processing section 12 uses the color information signals from the input section to generate, for each pixel, a local color feature vector representative of the color of the pixel. The color processing section 12 consists of a color processor array 20 and a feature fusion network array 23. The structure and operation of the color processing section 12 will be described in detail below in connection with FIG. 2. Similarly, the color boundary processing section 13 generates, for each pixel, a local color gradient feature vector that represents the gradient of the color at the pixel. The structure and operation of the color boundary processing section 13 will be described in detail below in connection with FIG. 3. The memory processor 29 is as described in STATIC MEMORY PROCESSOR, U.S. patent application Ser. No. 09/477,638. The parallel memory processors 16 and 18 are as described for the memory processor of the MULTIMODE INVARIANT PROCESSOR (U.S. patent application Ser. No. 09/641,395). The multi-mode invariant image processor, without its input sensor, is used for both parallel memory processors 16 and 18. The possible multiple outputs of the parallel memory processor 18 are the colored input object(s) classifications. The output vector array of the parallel memory processor 16 is a Positional King Of the Mountain (PKOM) array mapped to the pixels 15(m) in the retina, which becomes a map of color classifications of each pixel. It is noted that the PKOM array is a neural network array internal to the parallel memory processor 16 and the remaining neural circuits to the normal output of the MULTIMODE INVARIANT PROCESSOR are not used. The memory processor 29 is a static memory processor and provides an output classification as a degree of color comparison.

The local color feature vectors and the local color gradient feature vectors generated for all of the pixels are processed by the processing section 14 to, for example, classify the image into one of a plurality of image classes. The processing section 14 may comprise any of a plurality of processing elements for processing the vectors generated by the color processors 12, 13 and/or 19.

Figure 2:
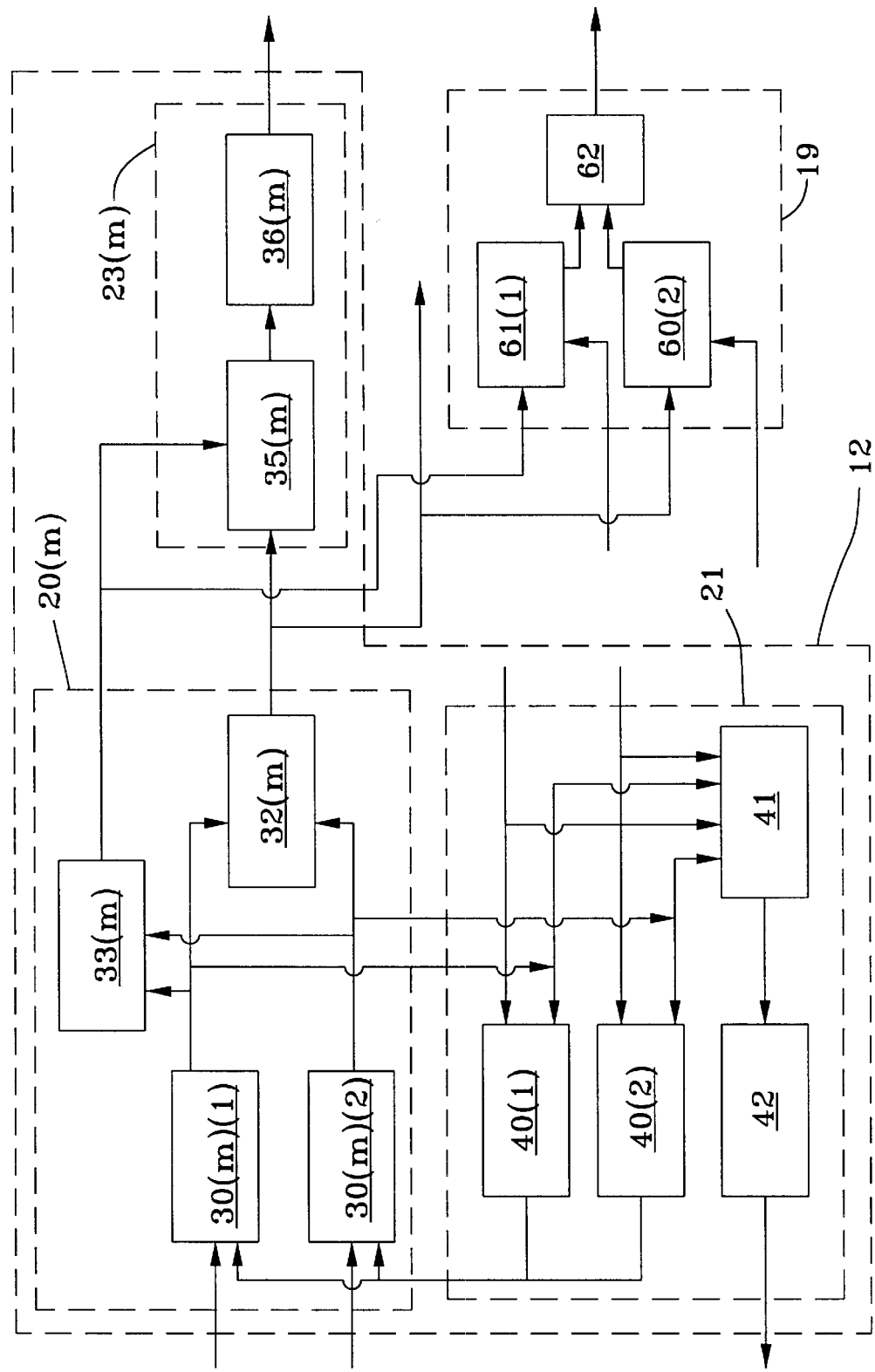
FIG. 2 is a functional block diagram of a color processor, which is useful in the color sensor depicted in FIG. 1.

FIG. 2 is a functional block diagram of color processing section 12 and 19 as used in the color sensor of FIG. 1. With reference to FIG. 2, the color processing section 12 includes a plurality of pixel color processors 20(1) through 20(M), generally identified by reference numeral 20(m). For each color processor 20(m), a corresponding feature fusion network 23(m) of color processing section 12 includes corresponding feature fusion neural directors 35(1) through 35(M) and Multi King Of the Mountain (MKOM) 36(1) through 36(M), generally identified by reference numerals 35(m) and 36(m), respectively. The structures of all of the pixel color processors 20(m) are similar, and so FIG. 2 depicts the structure of only one pixel color processor and the corresponding feature fusion neural director 35(m) and MKOM 36(m). Each pixel color processor 20(m) processes the outputs generated by one of the transducer pairs in the retina 11. The color processing section 12 also includes a common control 21, which controls all of the pixel color processors 20(m) in parallel, controls the iris 17 and receives pixel data from each color processor 20(m).

Each pixel color processor 20(m) includes controlled gain amplifier (CGA) circuits 30(m)(1), 30(m)(2), which receive the color amplitude signals generated by the respective transducers 15(m)(1), 15(m)(2). Each CGA circuit 30(m)(1), 30(m)(2) generates an output adjusted by a gain control factor generated by the common control 21. The gain control factor is a function of the output of the transducer for each frequency having the highest amplitude, referred to as 15(H)(1) and 15(H)(2). The CGA circuits 30(m)(1), 30(m) (2) will normalize the respective outputs in relation to the highest amplitude output for their respective frequency. This allows each transducer pair 15(m) and their respective CGA circuit 30(m) to output differing values, which represent the color at each transducer pair 15(m) as well as the "color temperature" of the light incident on the object or retina 15. The common control 21 senses all transducer outputs for each frequency and uses the highest outputs 15(H)(1), 15(H)(2) to set each CGA circuit 30(m) in the color processor 12 to the same gain as the CGA circuits 30(H)(1), 30(H)(2) from the pixel(s) 15(m) that sensed the highest light energy in retina 15. The transducers 15(H)(1), 15(H) (2), the CGA circuits 30(H)(1), 30(H)(2) and the common control 21 operate as an automatic gain controlled loop normalizing the output signal at CGA circuit 30(H)(1). Therefore, the response of each transducer 15(m)(1) is normalized at the output of each CGA circuit 30(m)(1) relative to the output of CGA circuit 30(H)(1). It is to be noted that the transducers 15(H)(1), 15(H)(2) need not be from the same pixel 15(m), as the spectral light energy of a visual scene image at two separate frequencies is generally not the same everywhere on retina 15.

The gain controlled output of each CGA circuit 30(m)(1), 30(m)(2) is provided to a number of elements, including a respective sum circuit 33(m), a difference circuit 32(m) and the common control 21. The outputs from the CGA circuits 30(m)(1), 30(m)(2) are coupled to the difference circuit, or difference generator 32(m), which generates an output vector that is representative of the difference between the amplitudes of the outputs form the CGA circuits 30(m)(1), 30(m)(2). Accordingly, it will be appreciated that the output generated by the difference generator 32(m) corresponds to the ratio of the amplitudes of the automatic controlled gain signals from the respective transducers 15(H)(1), 15(H)(2) and the respective pixel transducer 15(m) outputs.

As noted above, the outputs from the CGA circuits 30(m)(1) and 30(m)(2) are also coupled to a sum circuit 33(m). The sum circuit 33(m) generates an output that corresponds to the sum of the amplitudes of the automatic controlled gain signal from the respective transducers 15(m)(1) and 15(m)(2), and thus represents the brightness of the light incident on the pixel defined by the transducers.

The output vector from difference circuit 32(m) is coupled to the color boundary processor 13 (FIG. 1). The difference vector from difference circuit 32(m) and the brightness vector from sum circuit 33(m) are also both coupled to a neural director 35(m) that disperses these inputs into a local color feature vector. The neural director 35(m) is preferably similar to the neural directors as described in NEURAL DIRECTOR, U.S. patent application Ser. No. 09/436,957. Neural director 35(m) is preferably established to provide an output vector with an increased dimensionality, which will aid in distinguishing between similar patterns in the input vector.

The output of the neural director 35(m) is coupled to bipolar MKOM 36(m), which is described in detail in STATIC MEMORY PROCESSOR, U.S. patent application Ser. No. 09/477,638. The bipolar MKOM 36(m) generates a number of positive and/or negative outputs M(1) through M(R), generally identified by reference numeral M(r), each of which is associated with one dimension of the feature vector input thereto. Each positive component M(r) of the output vector can have a range of values from zero up to a maximum value, which corresponds to, or is proportional to, the maximum positive element value of the input vector. The positive outputs M(r) that are associated with an input vector component having successively lower positive values, are themselves successively lower in value, thus forming a positive ranking of the vector components. Outputs M(r) that are associated with input vector components having negative values are also ranked as negative vector components in a similar manner to the positive components. The rankings for the respective input feature vectors may be global, for all of the components of the input feature vector, or they may be localized among a selected number of preferably contiguous input feature vector components. The feature vector generated by the bi-polar MKOM 36(m) is coupled to the memory processing section 14.

The outputs from CGA circuits 30(m)(1) and 30(m)(2) of all of the pixel color processors 20(m) are also coupled to the common control 21. The common control 21 includes peak sensing circuits 40(1), 40(2), each of which receives the output from the correspondingly-indexed CGA circuits 30(m)(1), 30(m)(2), and each generates an output which corresponds to the one of the outputs from the correspondingly-indexed CGA circuits 30(m)(1), 30(m)(2) with the largest signal value. The outputs from the peak circuits 40(1), 40(2) are also connected to control the gain of all of the correspondingly-indexed CGA circuits 30(m)(1), 30(m)(2).

The outputs from the CGA circuits 30(m)(1) and 30(m)(2) of all of the color pixel processors 20(m) are also connected to a sum circuit 41. The sum circuit 41 generates an output, which represents the sum of the outputs from all of the CGA circuits 30(m)(1), 30(m)(2) of all of the color pixel processors 20(m). The output provided by the sum circuit 41 represents the total intensity or power of the light incident on the retina 15. An iris control circuit 42 uses the sum circuit 41 output to control the iris 17, which normalizes the intensity of the light on retina 15.

Figure 3:
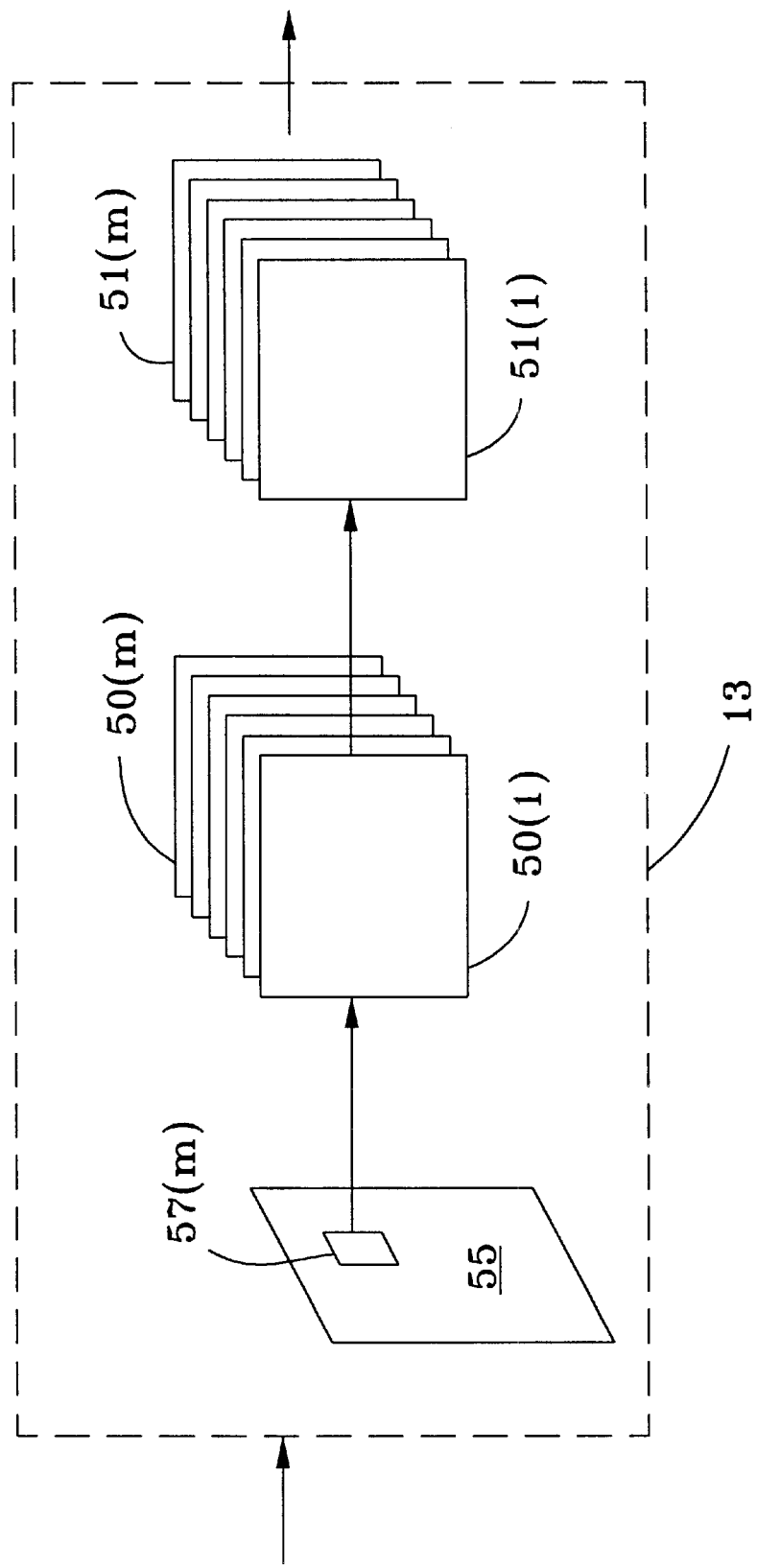
FIG. 3 is a functional block diagram of a color boundary processor, which is useful in the color sensor of in FIG. 1.
Figures 4A, 4B:
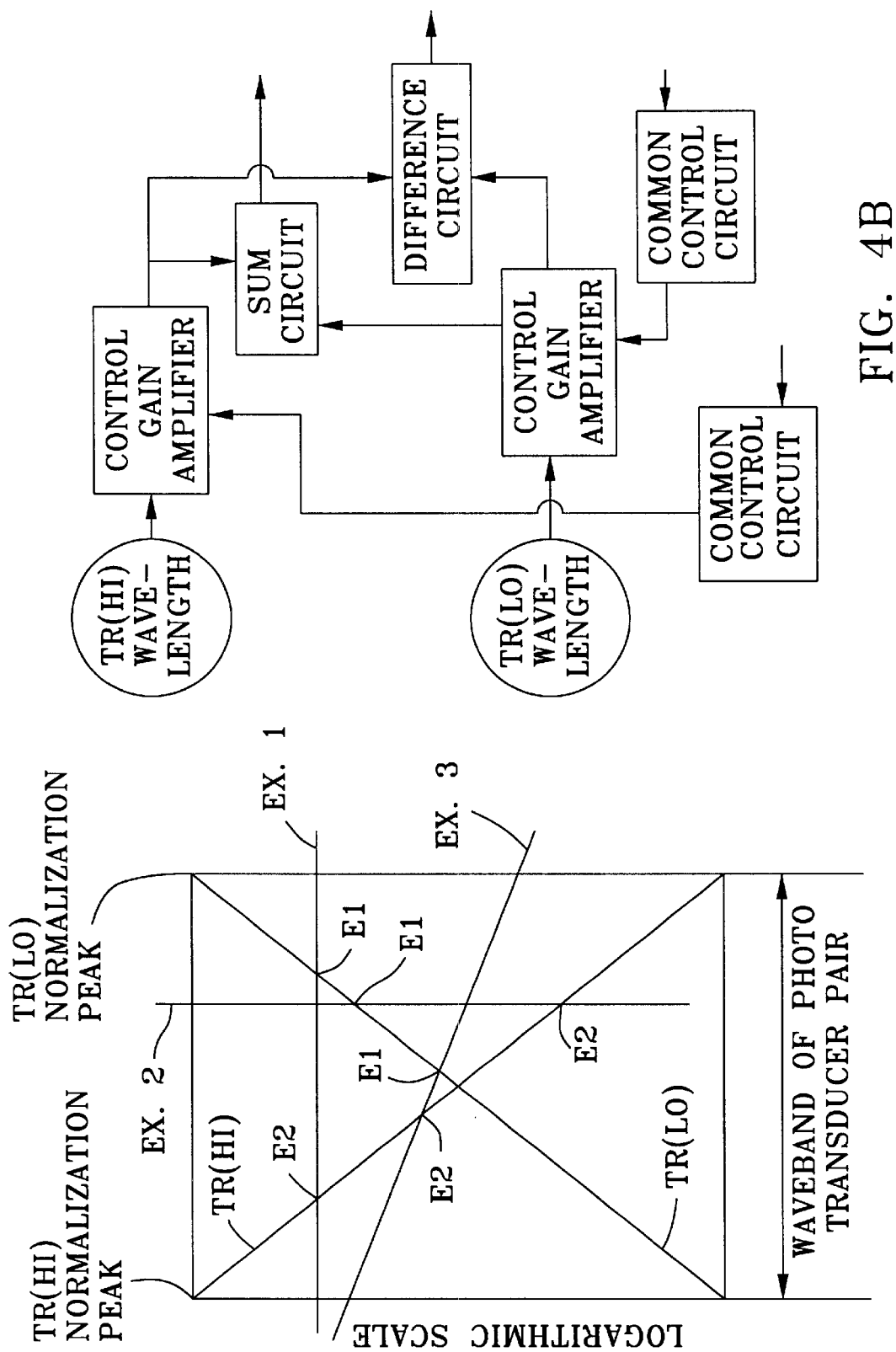
FIG. 4A is an example of the responses of two normalized photo transducers used in the color sensor.
FIG. 4B is a schematic illustration of the theorems defining the workings of the color sensor.

FIG. 3 is a functional block diagram of the color boundary processor 13, which is useful in the color sensor depicted in FIG. 1. The color boundary processor 13 can sense a colored object shape in a background of a different color. A black and white sensing retina often responds to different colors as equal lightness. Therefore, it may not sense an object of one color against a different background color. As noted above, the color boundary processor 13 receives the color vector signals from the difference circuits 32(m) of all of the pixel color processors 20(m). Color boundary processor 13 then generates an output for each pixel 15(m) that represents a color gradient for the pixel 15 (m). The outputs of each difference circuit 32(m) are spatially arranged exactly in the same spatial orientation as each associated pixel 15(m) in retina 15. The array of difference circuit 32(m) outputs becomes a virtual retina 55, shown in FIG. 3 to aid in the visualization of the spatial interconnections between the array of color processors 20 and color boundary processor 13. The color boundary processor 13 comprises a plurality of window difference networks 50(1) through 50(M), generally identified by reference numeral 50(m), each associated with one of the pixels 15(m) and associated window 57(m). Color boundary processor 13 further comprises a like plurality of neural directors 51(m).

Each window difference network 50(m) receives a local window array 57(m) of difference vectors generated by the correspondingly-indexed pixel color processor 20(m). Each window difference network 50(m), in turn, generates an output vector which represents a color acceleration vector between the difference vectors provided by the correspondingly-indexed pixel color processor 20(m) and color vectors for pixels within a predetermined area around the pixel 15(m), illustrated in FIG. 3 as local window 57(m). Local window 57(m) may consist of any chosen pattern of pixels surrounding pixel 15(m). e.g., a star pattern or a box pattern. Each neural director 51(m) receives the color acceleration vector from the correspondingly-indexed window difference network 50(m). As with neural director 35(m), each neural director 51(m) is preferably established to provide an output local color boundary feature vector with the same or an increased dimensionality, which will aid in distinguishing between similar patterns in the input vector.

In a modification to the invention 10, each pixel can be a three transducer set 15(m). Each transducer of the set 15(m) is to be matched to the response of the human retinal color cones. The three transducer set 15(m) will produce two "transducer pairs" for each pixel 15(m) and with two color processors 12 a color retina will be produced. The retina and two parallel memory processors 16 will sense color matched to the human color perception over a wide range of ambient lighting conditions.

With reference again to FIG. 1, the local color feature vectors generated by the pixel color processing section 12, an array of color comparators 19 and the local color boundary feature vectors generated by color boundary processor 13 for all of the pixels 15(m), are coupled to the memory processing section 14. The memory processing section 14 may perform a variety of individual or combined operations in connection with the feature vectors input thereto, including object recognition and the like, based on preselected object classification patterns or the like.

The invention provides a number of advantages. In particular, the invention provides a system for receiving an image of an object and generates, for an array of pixels of the image, color and color gradient/boundary information, in the form of feature vectors, which may be processed to, for example, classify the object into one of a plurality of object classes. The system generates the color and color gradient/boundary information using only two transducers for each pixel, in accordance with a bi-chromatic color recognition scheme, with the transducers having peak responses at selected colors 1 and 2, and a known output profile as a function of color, instead of the non-color constancy process produced in accordance with the tri-chromatic color recognition scheme.

It will be appreciated that numerous modifications may be made to the system 10. For example, the memory processing section 14 may perform processing in connection with comparisons generated for two images, using output color feature vectors generated either by the same color sensor 10 at two points in time, or output comparator vectors which are generated by two color sensors (the second being denoted by 11' and 12') for respective pixels 15($m$) for respective images. In that case, and with reference to FIG. 2, the color processing section 12, in particular the pixel color processors 20($m$), may provide outputs for the two images to the respective difference circuits 60($m$), 61($m$) of color comparison processor 19, each of which generates a difference vector representing the difference between the difference vectors and brightness vectors generated by the color processors 12 for the respective images. The difference vectors of 60($m$) and 61($m$) are input to comparator feature fusion network array 62, which operates in a manner similar to feature fusion network array 23. Similar difference circuits (not shown) may also be provided for the local color boundary feature vectors generated by the color difference processors 13 for the respective images.

In addition, the peak detector circuits 40(1), 40(2) of the common control 21 may be replaced with summing circuits that generate a sum output for controlling the CGA circuits 30($m$)(1), 30($m$)(2).

Preferably, the iris control 42 will generally rapidly adjust the iris in response to changes in the light intensity levels incident on the retina 15, so as to maintain the light levels incident on the transducers within a predetermined operating range. In that case, the CGA circuits 30($m$)(1), 30($m$)(2) may have a relatively slower response to changes in the automatic gain control signals from the control circuit 21. These differences in response will allow the slower response of normalization via the CGA circuits to maintain a steady color constancy in a scene of rapid brightness changes.

The described components of invention 10 provide the necessary components for a uniquely designed photographer's exposure and color temperature meter. A calibration of the common control network 21 provides values for exposure and color temperature data. The meter may be an independent device, i.e., a hand held meter, or it may be integrated in a camera body, either electronic or film, to provide automatic exposure and color temperature corrections. The device may also be integrated into color printers or printing presses as a color ink control.

It will be apparent that variations and modifications may be made to the invention herein described and illustrated, by those skilled in the art with the attainment of some or all of the advantages of the invention. It is also understood that the color sensor described herein may be connected to the various devices described in the referenced patent applications, wherein all the devices act in concert in a manner similar to the human eye. Therefore, it is the object of the appended claims to cover all such variations and modifications as come within the true spirit and scope of the invention.

What is claimed is:

1. A color sensor for generating color information defining colors of an input image, the color sensor comprising:

an input section including an array of transducer pairs, each transducer pair defining one of a plurality of pixels of said image, each transducer pair comprising at least two transducers each generating an output having a peak at a selected color, the selected color differing as between the two transducers, and each transducer having an output profile comprising a selected function of color;

a color processing section including a plurality of color pixel processors each receiving the outputs from the two transducers comprising the transducer pair associated with a pixel, and for generating in response a color feature vector representative of the brightness of the light incident on the pixel and a color value corresponding to the ratio of outputs from the transducers comprising the transducer pair associated with the pixel; and a color boundary processing section for generating a plurality of color boundary feature vectors, each associated with a pixel, each representing the difference between the color value generated by the pixel color processor for the respective pixel and color values generated by the pixel color processor for pixels neighboring the respective pixel.

2. A color sensor as defined in claim 1 in which said input section includes:

a retina comprising said transducer pair array;

a lens for focusing an image of an object onto said retina; and an adjustable iris situated between said lens and said retina for adjusting the intensity of light comprising said image on said retina.

3. A color sensor as defined in claim 2 in which said iris is adjustable in response to an adjustment signal representative of the intensity of light incident over the entire retina.

4. A color sensor as defined in claim 3 in which said color processor generates said adjustment signal in response to the sum of the amplitudes of all of the outputs generated by all of said transducers comprising the retina.

5. A color sensor as defined in claim 1, wherein the color processing section further comprises:

a plurality of pairs of controlled gain amplifier circuits, each pair associated with one of the color pixel processors, each one of the pair for receiving an output from one of the transducers comprising the transducer pair associated with the one color pixel processor, each controlled gain amplifier circuit generating a controlled gain output in response to the output from the transducer and a respective controlled gain signal; and a common control generating said controlled gain signals from said controlled gain outputs in a feedback loop manner, for controlling said controlled gain amplifier circuits of all of said color pixel processors in tandem.

6. A color sensor as defined in claim 5, further comprising, for each color pixel processor, a ratio generating circuit for generating a color vector output representative of a difference between amplitudes of the outputs of said controlled gain amplifier circuits, said color vector corresponding to said ratio of outputs.

7. A color sensor as defined in claim 5, further comprising, for each color pixel processor, a brightness value generating circuit for generating a brightness value corresponding to the sum of the controlled gain outputs generated by the respective controlled gain amplifier circuits.

8. A color sensor as defined in claim 7, wherein each color pixel processor further comprises:
   a neural director for receiving the color value and brightness value and generating in response an output vector having an increased dimensionality which will aid in distinguishing between similar patterns in the input image; and
   a multi-king-of-the-mountain circuit receiving the output vector of the neural director and generating a number of MKOM output vectors, each of which is associated with one dimension of the vector input thereto by the neural director, each component of the MKOM output vector having a value in a range of possible values from zero up to a maximum value related to the maximum positive element value of the input vector, the outputs associated with an input vector component having successively lower values being successively lower in value, forming a ranking of the vector components.

9. A color sensor as defined in claim 5, wherein the common control generates said controlled gain signals as a function of a peak output generated by respective ones of the controlled gain amplifier circuits of all of the color pixel processors.

10. A color sensor as defined in claim 9, wherein the common control generates said controlled gain signals as a function of a sum of the peak outputs.

11. A color comparator for comparing color information between a first input image and a second input image, the color comparator comprising:

an input section for each image, each input section including an array of transducer pairs, each transducer pair defining one of a plurality of pixels of said image, each transducer pair comprising at least two transducers each generating an output having a peak at a selected color, the selected color differing as between the two transducers, and each transducer having an output profile comprising a selected function of color;

a color processing section for each image, each color processing section including a plurality of color pixel processors each receiving the outputs from the two transducers comprising the transducer pair associated with a pixel, and for generating in response a color feature vector representative of the brightness of the light incident on the pixel and a color value corresponding to the ratio of outputs from the transducers comprising the transducer pair associated with the pixel; and a comparator section receiving the color feature vector and the color value from the color processing section for each image and generating a comparison feature fusion vector representative of color information differences in the first and second images.

12. A color comparator as defined in claim 11, wherein the comparator section further comprises:
   brightness difference circuit receiving the color feature vector for each of the images and generating a brightness difference vector;
   a color value difference circuit receiving the color value for each of the images and generating a color value difference vector; and
   a comparator feature fusion network array receiving the brightness difference vector and the color value difference vector and generating the comparison feature fusion vector.

* * * * *